Oct. 22, 1957     V. G. MATHISON     2,810,383
ELECTROPSYCHOMETER, OR BIOELECTRONIC INSTRUMENT
Filed Sept. 1, 1954
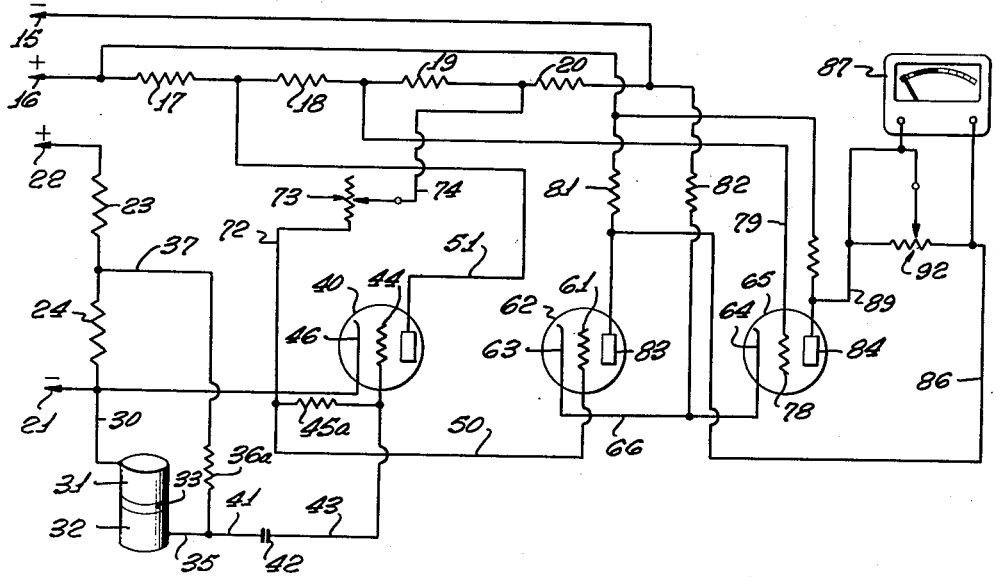
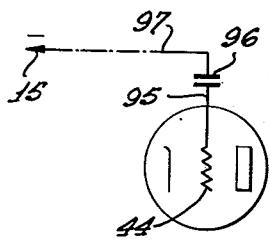
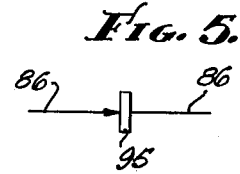
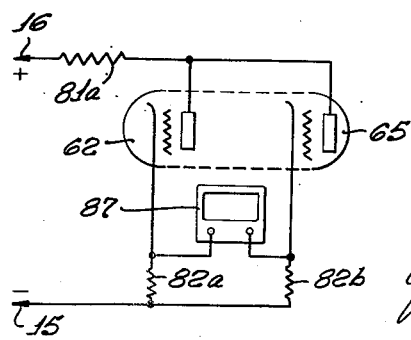
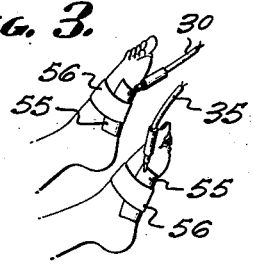
INVENTOR.
Volney G. Mathison 2,810,383
Patented Oct. 22, 1957

2,810,383

ELECTROPSYCHOMETER OR BIOELECTRONIC INSTRUMENT

Volney G. Mathison, Los Angeles, Calif.

Application September 1, 1954, Serial No. 453,495

10 Claims. (Cl. 128—2)

The disclosure herein is of an improved model of the electropsychometers previously claimed by me (Patent No. 2,684,670).

My original electropsychometer registered the onset of painful emotion in a patient by a surge action of a meter needle. After the occurrence of a surge, the operator was obliged to return the indicating needle to the zero or neutral area of the meter scale by manually readjusting a balancing resistance in the instrument. In the present invention, the needle of the indicating meter returns to a neutral area of the meter scale automatically after each surge of painful emotion experience by the person connected to the instrument.

The invention is fully disclosed, by way of example, in the accompanying drawings, in which Fig. 1 shows the generic circuit. In Fig. 2 is disclosed an important adjuvant element that may be used in the invention for neutralizing substantially the effects of A. C. line-voltage fluctuations and other extraneous electrical disturbances. Fig. 3 is a view of a pair of skin-contacting instep electrodes with elastic retaining straps, which may be used instead of the cylindrical hand-held electrode shown in Fig. 1. Fig. 4 discloses an alternative mode of connecting the indicating meter into the circuit. Fig. 5 discloses a current-rectifying element that may optionally be connected in series with the winding of the indicating meter.

Reference to the drawings will now be made by use of like characters that are used to designate corresponding parts or conductors throughout.

The numerals 15, 16 denote the negative and positive terminals of a source of vacuum tube plate power, which may be of any conventional type. 17, 18, 19, 20 denote four resistors which are connected in series across the negative and positive terminals 15, 16, forming a voltage-divider system across the said plate supply source.

21, 22 denote the negative and positive terminals of a second vacuum tube plate power supply source, which preferably is electrically independent of the source indicated above by the numerals 15, 16. 23, 24 denote two resistors connected in series across terminals 21, 22, forming a voltage divider across the said terminals.

A conductor 30 is connected from negative power supply terminal 21 to a conductive skin-contacting element 31. Element 31 and a second similar element 32 are mounted upon a common relatively non-conductive member 33. A conductor 35 connects electrode 32 to one terminal of a resistor 36a. A conductor 37 connects the other terminal of resistor 36a to a point of positive potential on the voltage divider system comprised of resistors 23, 24. A conductor also connects electrode element 32 to one terminal of a condenser 42. The other terminal of condenser 42 is connected by a conductor to the grid terminal 44 of a triode type vacuum tube 40. Grid element 44 is also connected to one terminal of a resistor 45a. The other terminal of resistance 45 is connected to cathode terminal 46 of vacuum tube 40. Cathode terminal 46 is also connected by a conductor to negative power supply terminal 21. A conductor 51 connected between voltage-divider resistors 17—18, delivers a positive potential to the plate terminal of vacuum tube 40.

The above-described parts and conductors provide a means for establishing an electrical potential across the elements 31, 32 of the skin-contacting electrode structure, and also provide a means for impressing transient variations of electrical potential upon the grid element of vacuum tube 40 which substantially are related to variations of ohmic resistance occurring across electrode elements 31, 32.

A conductor is connected from cathode terminal 46 of tube 40 to the grid terminal 61 of a second triode vacuum tube 62. The cathode terminal 63 of tube 62 and the cathode terminal 64 of a third triode vacuum tube 65 are connected to one terminal of a resistor 82. The other terminal of resistor 68 is connected to negative power supply terminal 15. A conductor 72 connects the grid terminal 61 of vacuum tube 62 to one terminal of a variable resistance 73. The other terminal of resistance 73 is connected between voltage-divider resistors 19, 20.

A conductor is connected from positive power supply terminal 16 to one terminal of a resistor 81 and to one terminal of another resistor 81a. The other terminal of resistor 81 is connected to the plate terminal 83 of vacuum tube 62. The second terminal of resistor 81a is connected to the plate terminal 84 of vacuum tube 65. A conductor is connected from plate terminal 83 of tube 62 to the positive terminal of an electromagnetic type of indicating meter 87. Another conductor connects the negative terminal of meter 87 to plate terminal 84 of tube 65.

I do not wish the invention limited to the use of the particular skin-contacting electrode structure shown in Fig. 1. An alternative electrode system is shown, by way of example, in Fig. 3, wherein the numeral 55 denotes a pair of substantially convex stainless steel plates which may be held in contact with the soles of the patient's feet by means of elastic arch straps 56.

An important adjuvant element is shown in Fig. 2. This element is a capacitor 96 which is connected by a conductor 95 to the grid terminal of vacuum tube 40 and by a conductor 97 to the negative terminal 15 of the major vacuum tube plate power supply source. This capacitor, when connected as shown, provides a means for substantially neutralizing the effects of transient A. C.-line-voltage fluctuations and other extraneous electrical disturbances, particularly stray radio-frequency impulses. Since the circuit disclosed in Fig. 1 is sometimes responsive to damped radio frequency disturbances, conventional expensive voltage-regulating systems may not eliminate transient A. C. line effects which are apt to be registered by spurious surges of the needle of meter 87. If the value of capacitor 96 is correct, it improves the operating characteristics of the instrument. However, I do not wish the invention limited to the use of this neutralizing capacitor. The instrument will function to a usable degree without it.

The invention functions substantially in the following manner:

Relatively abrupt or transient variations in ohmic resistance occurring across the terminals of the skin-contacting electrode system impress transient charges on the grid element of vacuum tube 40 through the capacitor 42, which in turn causes transient variations of potential at the grid and plate terminals of tubes 62 and 65 and at the terminals of the meter 87. As charges in the capacitor 42 and at the grid of tube 40 leak off through the resistor 45a, the potential at the terminals of the meter 87 diminishes and the needle of the meter returns to the position it occupied on the meter scale before the occurrence of the variation in resistance across the system of skin-contacting electrode elements. The indicating needle of the meter 87 can be zeroed or otherwise positioned on the meter scale by adjusting the value of the variable resistance 73, thereby varying the value of the biasing potential at the grid terminal of vacuum tube 62, which in turn governs the degree of difference of potential appearing between the plate elements of vacuum tubes 62 and 65, to which the terminals of the surge meter 87 are connected. With reference to the case of a person to whom the system of skin-contacting electrodes is applied, the onset of painful emotion causes a sudden drop in the value of ohmic resistance between conductors 30 and 35, which effects a sharp increase in the value of the current flowing through meter 87, and causes the needle to surge to the right. Conversely, the development of relatively pleasant emotion in the case may cause a rise in ohmic resistance across the terminals of the skin-contacting electrode system, effecting a decrease in current flow through meter 87, and a consequent movement of the needle to the left toward the zero-current end of the indicating scale.

The sensitivity of response of meter 87 may be governed by shunting its terminals with a potentiometer 92. This potentiometer and the moving coil of the meter act together as a variable electrodynamic braking system that simultaneously controls the value of potential at the terminals of the meter and acts as a damping device on the movement of the meter needle. I do not wish the invention limited, however, to include the use of potentiometer 92. Other means may be employed to vary the sensitivity of response of the instrument.

The electrical values of the parts of this invention are interrelated to an extreme degree, and are also related to the values of the voltages applied across terminals 15, 16 and 21, 22, and to the physical design and dimensions of the skin-contacting electrode elements 31, 32. The correct values can be ascertained only by extensive tests on actual patients. A workable combination is as follows: Potential across terminals 15, 16, 250 volts. Potential across the terminals of the skin-contacting electrode structure shown in Fig. 1, 10 volts. Resistor 17, 56K; resistor 18, 10K; resistor 19, 3K; resistor 30, 27K. Resistor 23, 39K; resistor 24, 5600 ohms. Resistor 36–a, 2 megohms; adjustable resistance 73, 30K; potentiometer 92, 5K, resistors 81, 82, 56K; resistor 68, 27K. Vacuum tube 40 may be a 6SF5; tubes 62 and 65 may be the two sections of a 6SN7 tube with a common envelope, or may be two separate 6J5 tubes. Meter 87 may be of 50 microampere direct current type with windings of 1800 ohms; capacitor 42 may be of ½ microfarad, capacitor 96 may be of ¼ microfarad; capacitor 99 if used, from ¼ to 16 mfd. Electrode elements 31, 32 may be two inches in diameter by two inches in length, separated ⅜ inch on a common insulating member. Instep electrode elements, Fig. 3 may be two inches wide by three inches long.

Fig. 4 discloses a modification wherein the winding of the meter 87 is connected between the terminals of the cathode elements of vacuum tubes 62 and 65. In this modification, the plate elements of vacuum tubes 62 and 65 are connected in common to one terminal of a single resistance 81a, the other terminal of the resistance 81a being connected to the positive terminal 16 of the plate power supply source from which the operating potential applied to tubes 62 and 65 is derived, while the cathode elements of the said tubes are connected separately through resistances 82a and 82b individual to each cathode element to the negative terminal 15 of the plate power supply source. The operation of meter 87 is substantially the same, whether it is connected between the plate terminals of tubes 62 and 65 as shown in Fig. 1, or between the cathode terminals of the said tubes, as shown in Fig. 4.

Throughout this specification and in all of the claims appended hereto, each section of any twin type tube is invariably described and referred to as a separate tube. In all of the claims appended hereto, vacuum tube 40 is designated as the first triode type vacuum tube, tube 62 is designated as the second triode type tube, and tube 65 is designated as the third triode type tube.

An important advantage of the novel electronic circuit disclosed in this invention is that it permits the inclusion of a simple means for substantially neutralizing the effects of A. C. line voltage fluctuations and other extraneous electrical disturbances, and therefore does not require an elaborate voltage-regulating or plate power supply filtering system. The circuit also lends itself to a considerable variety of possible meter response characteristics, depending on the values of the components used.

I claim:

1. An electropsychometer, a bioelectronic instrument that registers certain electropsychophysical reactions and conditions in the case of a person to whom it is applied, comprising three triode-type vacuum tubes, or a lesser number of twin-type vacuum tubes described and considered as equivalent to three triode-type separate tubes and hereinafter designated in this claim and in succeeding dependent claims, as the first, second and third vacuum tube, a skin-contacting electrode structure consisting of two or more electrically conductive elements mounted on a relatively non-conductive member, means for establishing an electrical potential between the said electrode elements, means for connecting the positively polarized element, or elements of the said skin-contacting electrode structure to one terminal of a capacitor, the other terminal of the said capacitor being connected to the grid terminal of the above-mentioned first vacuum tube, the grid terminal of the said vacuum tube also being connected to one terminal of a variable resistance, the other terminal of the said variable resistance being connected to the cathode terminal of the aforesaid first vacuum tube, the said cathode terminal of the said first tube also being connected to the negatively polarized element or elements of the aforesaid skin-contacting electrode structure, a conductor from the cathode terminal of the said first vacuum tube to the grid terminal of a previously mentioned second vacuum tube, a conductor from the cathode terminal of the said second vacuum tube to the cathode terminal of a previously mentioned third vacuum tube, means for establishing an electrical potential between the plate and cathode elements of the said second and third vacuum tubes, the said electrical potential being derived from a common vacuum tube plate power supply source, the said power supply source having a voltage-dividing network connected between the positive and negative terminals thereof, a conductor from a point on the said voltage-dividing network to the plate terminal of the aforesaid first vacuum tube, means for establishing biasing potentials at the grid terminals of the aforesaid second and third vacuum tubes, an electromagnetic type of indicating meter, the winding of the said meter being connected between the terminals of the plate elements of the aforesaid second and third vacuum tubes.

2. An electropsychometer, a bioelectronic instrument that registers certain electropsychophysical reactions and conditions in the case of a person to whom it is applied, comprising three triode-type vacuum tubes, or a lesser number of twin-type vacuum tubes described and considered as equivalent to three triode-type separate tubes and hereinafter designated in this claim and in succeeding dependent claims, as the first, second and third vacuum tube, a skin-contacting electrode structure consisting of two or more electrically conductive elements mounted on a relatively non-conductive member, means for establishing an electrical potential between the said electrode elements, means for connecting the positively polarized element, or elements of the said skin-contacting electrode structure to one terminal of a capacitor, the other terminal of the said capacitor being connected to the grid terminal of the above-mentioned first vacuum tube, the grid terminal of the said vacuum tube also being connected to one terminal of a resistance, the other terminal of the said resistance being connected to the cathode terminal of the aforesaid first vacuum tube, the said cathode terminal of the said first tube also being connected to the negatively polarized element or elements of the aforesaid skin-contacting electrode structure, a conductor from the cathode terminal of the said first vacuum tube to the grid terminal of a previously mentioned second vacuum tube, a conductor from the cathode terminal of the said second vacuum tube to the cathode terminal of a previously mentioned third vacuum tube, means for establishing an electrical potential between the plate and cathode elements of the said second and third vacuum tubes, the said electrical potential being derived from a common vacuum tube plate power supply source, means for connecting the plate terminal of the aforesaid first vacuum tube to the said power supply source, means for establishing biasing potentials at the grid terminals of the aforesaid second and third vacuum tubes, an electromagnetic type of indicating meter, the winding of the said meter being connected between the terminals of the aforesaid second and third vacuum tubes.

3. An electropsychometer, a bioelectronic instrument, comprising the parts, members, and conductors, and with the relationships and connections thereof set forth in a preceding claim, designated as claim No. 2, and with the addition thereto of a capacitor, one terminal of the said capacitor being connected to the grid terminal of that vacuum tube which is designated in claim No. 2 as the first vacuum tube, the other terminal of the said capacitor being connected to the negative terminal of that source of plate power supply to which the plate terminal of the aforesaid first vacuum tube is connected, the said added capacitor and the conductors connected thereto providing a means whereby extraneous electrical disturbances that may cause spurious registrations on the electromagnetic indicating meter mentioned in claim No. 2 are substantially neutralized.

4. An electropsychometer, a bioelectronic instrument, comprising the parts, members, and conductors, and with the relationships and connections thereof set forth in a preceding claim, designated as claim No. 2, and with the addition thereto of a capacitor, one terminal of the said capacitor being connected to the plate terminal of that vacuum tube which is designated in claim No. 2 as the first vacuum tube, and the other terminal of the said capacitor being connected to the grid terminal of that vacuum tube which is designated in claim No. 2 as the second vacuum tube, the said added capacitor providing a means whereby the characteristic response of the needle of the electromagnetic indicating meter mentioned in claim No. 2 may be modified to afford an increased time lag.

5. An electropsychometer, a bioelectronic instrument that registers certain electropsychophysical reactions and conditions in the case of a person to whom it is applied, comprising three triode type vacuum tubes, or a lesser number of twin-type tubes described and considered as equivalent to three triode type separate tubes and hereinafter designated in this claim and in succeeding dependent claims as the first, second, and third vacuum tube, an electromagnetic type of indicating meter, and a system of skin-contacting electrode elements, means for establishing an electrical potential between the terminals of the said system of skin-contacting electrode elements, means for connecting the positively polarized skin-contacting element or elements to one terminal of a capacitor, the other terminal of the said capacitor being connected to the grid terminal of the above-mentioned first vacuum tube, the grid terminal of the said vacuum tube also being connected to one terminal of a resistance, the other terminal of the said resistance being connected to the cathode terminal of the aforesaid first vacuum tube, the said cathode terminal of the said first tube also being connected to the negatively polarized element or elements of the above-mentioned system of skin-contacting electrode elements, a conductor from the cathode terminal of the said first vacuum tube to the grid terminal of a previously mentioned second vacuum tube, a conductor from the cathode terminal of the said second vacuum tube to the cathode terminal of a previously mentioned third vacuum tube, means for establishing an electrical potential between the plate and cathode elements of the said second and third vacuum tubes, the said electrical potential being derived from a common vacuum tube plate power supply source, means for connecting the plate terminal of the aforesaid first vacuum tube to the said power supply source, means for establishing biasing potentials at the grid terminals of the aforesaid second and third vacuum tubes, an electromagnetic type of indicating meter, the winding of the said meter being connected between the terminals of the plate elements of the aforesaid second and third vacuum tubes, means for varying the sensitivity of response of the above-mentioned electromagnetic indicating meter.

6. An electropsychometer, a bioelectronic instrument, comprising the parts, elements, and conductors, and with the relationships and connections thereof set forth in the preceding claim, designated as claim No. 5, and with the addition thereto of a capacitor, one terminal of the said capacitor being connected to the grid terminal of that vacuum tube which is designated in claim No. 5 as the first vacuum tube, the other terminal of the said capacitor being connected to the negative terminal of that source of vacuum tube plate power supply to which the plate terminal of the aforesaid first vacuum tube is connected, the said added capacitor and the conductors connected thereto providing a means whereby extraneous electrical disturbances that may cause spurious registrations on the electromagnetic indicating meter mentioned in claim No. 5 are substantially neutralized.

7. An electropsychometer, a bioelectronic instrument, comprising the parts, elements, and conductors, and with the relationships and connections thereof set forth in a preceding claim, designated as claim No. 5, and with the addition of a capacitor, one terminal of the said capacitor being connected to the plate terminal of that vacuum tube which is designated in claim No. 5 as the first vacuum tube, and the other terminal of the said capacitor being connected to the grid terminal of that vacuum tube which is designated in claim No. 5 as the second vacuum tube, the said added capacitor providing a means whereby the characteristic response of the needle of the electromagnetic indicating meter mentioned in claim No. 5 may be modified to afford an increased time lag.

8. An electropsychometer, a bioelectronic instrument that registers certain electropsychophysical reactions and conditions in the case of a person to whom it is applied, comprising three triode-type vacuum tubes, or a lesser number of twin-type tubes described and considered as equivalent to three separate triode type tubes and hereinafter designated in this claim as the first, second and third vacuum tube, a skin-contacting electrode structure consisting of two or more electrically conductive elements mounted on a relatively non-conductive member, means for establishing an electrical potential between the said electrode elements, means for connecting the positively polarized element or elements of the said skin-contacting electrode structure to one terminal of a capacitor, the other terminal of the said capacitor being connected to the grid terminal of the above-mentioned first vacuum tube, the grid terminal of the said vacuum tube also being connected to one terminal of a resistance, the other terminal of the said resistance being connected to the cathode terminal of the aforesaid first vacuum tube, the said cathode terminal of the said first tube also being connected to the negatively polarized element or elements of the aforesaid skin-contacting electrode structure, a conductor from the cathode terminal of the said first vacuum tube to the grid terminal of a previously mentioned second vacuum tube, a conductor from the cathode terminal of the said second vacuum tube to one terminal of a resistor, the other terminal of the said resistor being connected to the negative terminal of the source of plate power supply from which the operating potential applied to the plate and cathode elements of the aforesaid second vacuum tube is derived, a previously mentioned third vacuum tube, a conductor from the cathode terminal of the said third vacuum tube to one terminal of a resistor, the other terminal of the said resistor being connected by a conductor to the negative terminal of the source of plate power supply from which the operating potential of the aforesaid third vacuum tube is derived, the plate terminals of the aforesaid second and third vacuum tubes being connected together and in common to one terminal of a resistance, the other terminal of the said resistance being connected to the positive terminal of the above-mentioned plate power supply source, an electromagnetic type of indicating meter, the terminals of the said meter being connected across the cathode terminals of the aforesaid second and third vacuum tubes.

9. An electropsychometer, a bioelectronic instrument that registers certain electropsychophysical reactions and conditions in the case of a person to whom it is applied, comprising three triode-type vacuum tubes or a lesser number of twin-type tubes described and considered as equivalent to three separate triode-type tubes and hereinafter designated in this claim as the first, second and third vacuum tube, a system of skin-contacting electrode elements, means for establishing an electrical potential between the terminals of the said system of skin-contacting electrode elements, means for connecting the positively polarized skin-contacting element or elements to one terminal of a capacitor, the other terminal of the said capacitor being connected to the grid terminal of the above-mentioned first vacuum tube, the grid terminal of the said vacuum tube also being connected to one terminal of a resistance, the other terminal of the said resistance being connected to the cathode terminal of the aforesaid first vacuum tube, the said cathode terminal of the said first tube also being connected to the negatively polarized element or elements of the above-mentioned system of skin-contacting electrode elements, a conductor from the cathode terminal of the said first vacuum tube to the grid terminal of a previously mentioned second vacuum tube, a conductor from the cathode terminal of the said second vacuum tube to one terminal of a resistor, the other terminal of the said resistor being connected to the negative terminal of the source of plate power supply from which the operating potential applied to the plate and cathode elements of the aforesaid second vacuum tube is derived, a previously mentioned third vacuum tube, a conductor from the cathode terminal of the said third vacuum tube to one terminal of a resistor, the other terminal of the said resistor being connected by a conductor to the negative terminal of the source of plate power supply from which the operating potential of the aforesaid third vacuum tube is derived, the plate terminals of the aforesaid second and third vacuum tubes being connected together and in common to one terminal of a resistance, the other terminal of the said resistance being connected to the positive terminal of the above-mentioned plate power supply source, an electromagnetic type of indicating meter, the terminals of the said meter being connected across the cathode terminals of the aforesaid second and third vacuum tubes.

10. An electropsychometer, a bioelectronic instrument that registers certain electropsychophysical reactions and conditions in the case of a person to whom it is applied, comprising three triode-type vacuum tubes or a lesser number of twin-type tubes described and considered as equivalent to three separate triode-type tubes and hereinafter designated in this claim as the first, second, and third vacuum tube, a skin-contacting electrode system consisting of two substantially curved electrode elements with elastic straps for retaining the said electrode elements against the soles of the feet of a patient, means for establishing an electrical potential between the terminals of the said system of skin-contacting electrodes, means for connecting the positively polarized skin-contacting electrode element to one terminal of a capacitor, the other terminal of the said capacitor being connected to the grid terminal of the above-mentioned first vacuum tube, the grid terminal of the said vacuum tube also being connected to one terminal of a resistance, the other terminal of the said resistance being connected to the cathode terminal of the aforesaid first vacuum tube, the said cathode terminal of the said first tube also being connected to the negatively polarized electrode element of the above-mentioned system of skin-contacting electrodes, a conductor from the cathode terminal of the said second vacuum tube to the cathode terminal of the previously-mentioned third vacuum tube, means for establishing an electrical potential between the plate and cathode elements of the said second and third vacuum tubes, the said electrical potential being derived from a common vacuum tube plate power supply source, means for connecting the plate terminal of the aforesaid first vacuum tube to the said power supply source, means for establishing biasing potentials at the grid terminals of the aforesaid second and third vacuum tubes, an electromagnetic type of indicating meter, the winding of the said meter being connected between the terminals of the aforesaid second and third vacuum tubes.

References Cited in the file of this patent

UNITED STATES PATENTS

| | | |
|---|---|---|
| 2,308,933 | Raesler | Jan. 19, 1943 |
| 2,657,683 | Koller | Nov. 3, 1953 |